US011915625B2

(12) United States Patent
Min

(10) Patent No.: US 11,915,625 B2
(45) Date of Patent: Feb. 27, 2024

(54) DISPLAY DEVICE

(71) Applicant: Samsung Display Co., Ltd., Yongin-si (KR)

(72) Inventor: Myoung An Min, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 121 days.

(21) Appl. No.: 17/576,788

(22) Filed: Jan. 14, 2022

(65) Prior Publication Data

US 2022/0238049 A1 Jul. 28, 2022

(30) Foreign Application Priority Data

Jan. 22, 2021 (KR) ........................ 10-2021-0009404

(51) Int. Cl.
*G09F 9/30* (2006.01)

(52) U.S. Cl.
CPC .................................... *G09F 9/301* (2013.01)

(58) Field of Classification Search
CPC ....................................................... G09F 9/301
See application file for complete search history.

(56) References Cited

U.S. PATENT DOCUMENTS

| | | | | |
|---|---|---|---|---|
| 10,915,140 | B2 * | 2/2021 | Kim | G06F 1/1681 |
| 11,256,293 | B2 * | 2/2022 | Lee | G06F 1/1681 |
| 11,263,932 | B2 * | 3/2022 | Ko | G06F 1/1652 |
| 11,347,269 | B2 * | 5/2022 | Yug | G02B 1/12 |
| 11,348,488 | B2 * | 5/2022 | Jang | H04M 1/0268 |
| 2020/0257335 | A1 * | 8/2020 | Kim | H04M 1/022 |
| 2020/0333845 | A1 * | 10/2020 | Yug | H04M 1/0216 |
| 2020/0344897 | A1 * | 10/2020 | Kim | G06F 1/1641 |
| 2020/0371551 | A1 * | 11/2020 | Kim | G06F 1/1637 |
| 2021/0028391 | A1 * | 1/2021 | Yug | B23K 26/364 |
| 2021/0043858 | A1 * | 2/2021 | Choi | H10K 59/12 |
| 2021/0319724 | A1 * | 10/2021 | Jang | G06F 1/1641 |
| 2022/0294886 | A1 * | 9/2022 | Seo | H04M 1/0237 |

FOREIGN PATENT DOCUMENTS

| | | | |
|---|---|---|---|
| KR | 10-1524921 | B1 | 6/2015 |
| KR | 10-2016-0017843 | A | 2/2016 |
| KR | 10-2016-0144912 | A | 12/2016 |
| KR | 10-2019-0052475 | A | 5/2019 |
| KR | 10-2020-0064376 | A | 6/2020 |
| KR | 10-2021-0091388 | A | 7/2021 |

* cited by examiner

*Primary Examiner* — Lisa Lea-Edmonds
(74) *Attorney, Agent, or Firm* — Lewis Roca Rothgerber Christie LLP

(57) ABSTRACT

A display device includes: a display panel; and a back plate on a rear side of the display panel, and including a first folding area configured to be folded in a first direction and a second folding area crossing the first folding area and configured to be folded in a second direction.

19 Claims, 11 Drawing Sheets

DISPLAY DEVICE

CROSS-REFERENCE TO RELATED APPLICATION

The present application claims priority to and the benefit of Korean Patent Application No. 10-2021-0009404 filed in the Korean Intellectual Property Office on Jan. 22, 2021, the entire content of which is incorporated herein by reference.

BACKGROUND

1. Field

Aspects of some embodiments of the present disclosure relate to a display device.

2. Description of the Related Art

Various electronic devices, such as mobile phones, tablets, multimedia players, or televisions, to which a liquid crystal display (LCD) or an organic light emitting diode (OLED) is applied as a display device, have been used.

Recently, various types of display devices have been developed. For example, flexible display devices that may be bent in a curved way, folded, or wrapped thereby allowing a wide control range of shapes and sizes are being developed. A flexible substrate used in a flexible display devices may be very thin, so a back plate for supporting the flexible substrate may be positioned at the bottom of the flexible substrate. However, when the display device is repeatedly folded and unfolded, plastic deformation of the back plate and/or the flexible substrate so that the display device may not be restored to the proper or intended shape, and a high amount of stress may be applied to the back plate.

The above information disclosed in this Background section is only for enhancement of understanding of the background and therefore the information discussed in this Background section does not necessarily constitute prior art.

SUMMARY

Aspects of some embodiments of the present invention may include a display device that may be relatively easily folded or unfolded in at least two directions.

According to some embodiments of the present invention, a display device includes: a display panel; and a back plate including a first folding area positioned on the display panel and folded in a first direction and a second folding area crossing the first folding area and folded in a second direction.

According to some embodiments, the first folding area may include a plurality of first holes of which a length in the first direction is less than a length in the second direction in a plan view.

According to some embodiments, the first holes may be arranged with a first length in the first direction and may be arranged with a second length in the second direction, and the first length may be less than the second length.

According to some embodiments, the second folding area may include a plurality of second holes of which a length in the first direction is greater than a length in the second direction in a plan view.

According to some embodiments, the second holes may be arranged with a third length in the first direction and may be arranged with a fourth length in the second direction, and the third length may be greater than the fourth length.

According to some embodiments, the display panel may include a flexible substrate, and a modulus of the back plate may be greater than that of the flexible substrate.

According to some embodiments, the first holes may have at least one shape of a rectangle of which a long side is parallel with the second direction, a rhombus of which a long side is parallel with the second direction, an oval of which a long axis is parallel with the second direction, and a square.

According to some embodiments, the second holes may have at least one shape of a rectangle of which a long side is parallel with the first direction, a rhombus of which a long side is parallel with the first direction, an oval of which a long axis is parallel with the first direction, and a square.

According to some embodiments, the back plate may further include a third folding area, and the third folding area may include a region in which the first folding area overlaps the second folding area.

According to some embodiments, a length of the third folding area in the first direction may be greater than the first length, and a length thereof in the second direction may be greater than the fourth length in a plan view.

According to some embodiments, the third folding area may include a plurality of third holes of which a length in the first direction is greater than the length in the second direction in a plan view, and the third holes may be arranged with a first length in the first direction and may be arranged with a fourth length in the second direction.

According to some embodiments, the third folding area may include a plurality of third holes of which a length in a first direction is less than a length in a second direction in a plan view, and the third holes may be arranged with a first length in the first direction and may be arranged with a fourth length in the second direction.

According to some embodiments, the third folding area may include a plurality of third holes of which a length in a first direction is the same as a length in a second direction in a plan view, and the third holes may be arranged with a first length in the first direction and may be arranged with a fourth length in the second direction.

According to some embodiments, the third folding area may be made of at least one of polyurethane (PU), thermoplastic polyurethane (TPU), polyacrylate, or rubber.

According to some embodiments, the third folding area may be manufactured by at least one method of injection molding, extrusion molding, vacuum molding, and casting molding.

According to some embodiments, the back plate may further include a step compensating member for filling the third holes.

According to some embodiments, the step compensating member may be made of at least one of polyurethane (PU), thermoplastic polyurethane (TPU), polyacrylate, and rubber.

According to some embodiments, the third holes may penetrate the back plate in a thickness direction of the back plate.

According to some embodiments, the third holes may be positioned on at least one of an upper side or a lower side of the back plate, and a depth of the third hole may be less than a depth of the back plate.

According to some embodiments of the present invention, a back plate includes: a first folding area folded in a first direction; a second folding area crossing the first folding area and folded in a second direction; and a third folding area in which the first folding area overlaps the second folding area, wherein the first folding area may include a plurality of first holes of which a length in the first direction is less than a length in the second direction in a plan view, the first holes are arranged with a first length in the first direction and may be arranged with a second length in the second direction, the first length may be less than the second length, the second folding area may include a plurality of second holes of which a length in the first direction is greater than a length in the second direction in a plan view, the second holes may be arranged with a third length in the first direction and may be arranged with a fourth length in the second direction, the third length may be greater than the fourth length, the third folding area may include a plurality of third holes of which a length in a first direction is the same as a length in a second direction in a plan view, and the third holes may be arranged with a first length in the first direction, and may be arranged with a fourth length in the second direction.

According to some embodiments of the present disclosure, the display device may be relatively easily folded and unfolded.

According to some embodiments of the present disclosure, durability of a display device may be relatively improved.

DETAILED DESCRIPTION

Figure 1:
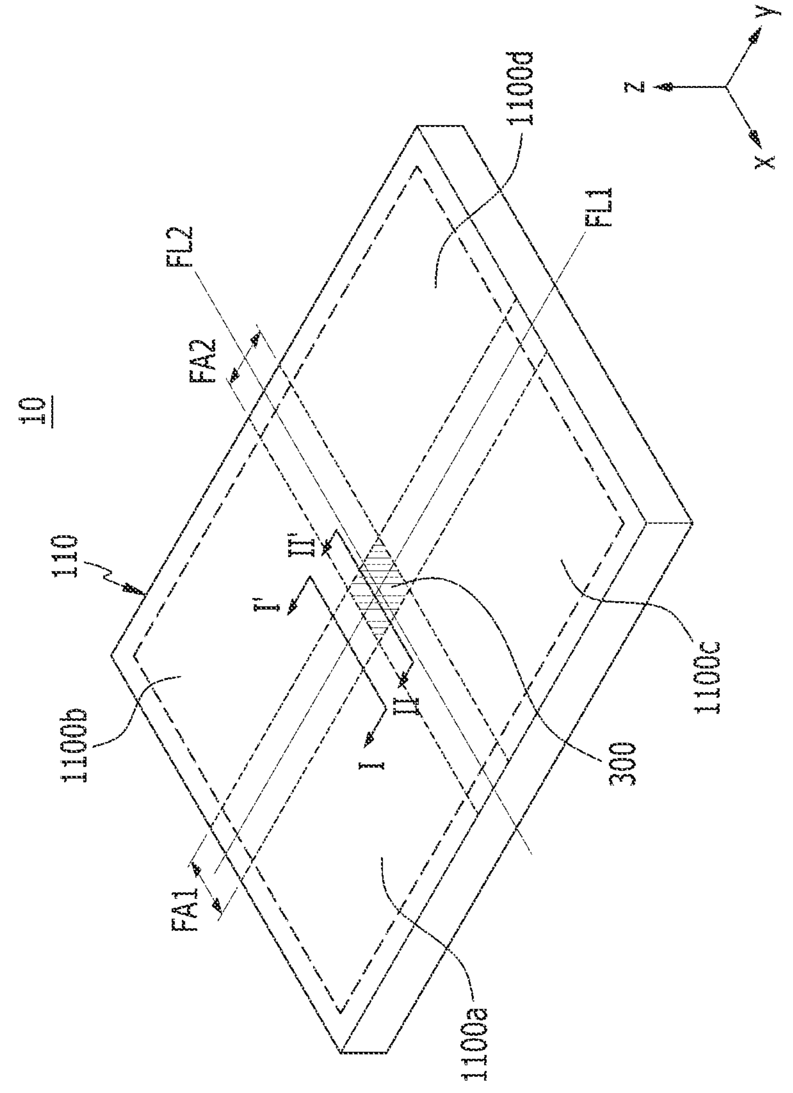
FIG. 1 shows a perspective view of a display device according to some embodiments of the present disclosure.

Aspects of some embodiments of the present invention will be described more fully hereinafter with reference to the accompanying drawings, in which aspects of some embodiments of the invention are shown. As those skilled in the art would realize, the described embodiments may be modified in various different ways, all without departing from the spirit or scope of embodiments according to the present invention.

Descriptions of some components or parts that may not be necessary to enable a person having ordinary skill in the art to make, use, and understand aspects of embodiments according to the present invention may be omitted, and the same elements in different embodiments may be designated by the same reference numerals throughout the specification.

The size and thickness of each configuration shown in the drawings are arbitrarily shown for better understanding and ease of description, but the present invention is not limited thereto. In the drawings, the thickness of layers, films, panels, regions, etc., are exaggerated for clarity. The thicknesses of some layers and areas are exaggerated for convenience of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

Terms "x", "y", and "z" are used, and here, "x" is a first direction, "y" is a second direction that is perpendicular to the first direction, and "z" is a third direction that is perpendicular to the first direction and the second direction. The first direction (x), the second direction (y), and the third direction (z) may correspond to a horizontal direction, a vertical direction, and a thickness direction of the display device.

The phrase "in a plan view" means viewing an object portion from the top, and the phrase "in a cross-sectional view" means viewing a cross-section of which the object portion is vertically cut from the side.

FIG. 1 shows a perspective view of a display device according to some embodiments of the present disclosure.

The display device 10 may include a display panel 110 for receiving data signals and displaying images.

While the display device 10 is unfolded, the display panel 110 may include a display area 1100*a* for displaying images, and a non-display area 1100*b* positioned at an edge of the display area 1100*a* (e.g., around a periphery or outside a footprint of the display area 1100*a*) at which images are not displayed. That is, the non-display area 1100*b* may operate as a bezel area. The display area 1100*a* may face toward a front of the display device 10 and may display images. Certain signal wires or driving circuits for applying signals to the display area 1100*a* may be located in the non-display area 1100*b*.

Referring to FIG. 1, the display area 1100*a* is illustrated as having a rectangular shape, but according to various embodiments, the display area 1100*a* may have a rectangular shape with round corners, and/or the display area 1100*a* may have various other shapes such as squares, polygons, circles, or ovals.

The display panel 110 of the display device 10 according to some embodiments may include a plurality of folding areas. The display panel 110 may be folded along folding lines FL1 and FL2. When the display panel 110 is folded, it may not be folded so as to have a specific angle in a folding line (e.g., a set or predetermined folding line), but it may be folded with a curvature (e.g., a set or predetermined curvature), so that the folding area is positioned at a set or predetermined section or location of the display panel 110. That is, when the display panel 110 is folded with respect to the folding line FL1, the folding area FA1 may be bent with a curvature (e.g., a set or predetermined curvature) at the respective positions. When the display panel 110 is folded with respect to the folding line FL2, the folding area FA2 may be bent with a curvature (e.g., a set or predetermined curvature) at the respective positions.

A plurality of folding areas may include a first folding area FA1 and a second folding area FA2. The first folding area FA1 may be folded along the first folding line FL1, and the second folding area FA2 may be folded along the second folding line FL2. Referring to FIG. 1, the first folding area FA1 and the second folding area FA2 are shown to be positioned in a center of the display panel 110, but the positions of the folding areas (FA1 and FA2) are not limited thereto. Further, at least two of the folding areas (FA) may be defined. According to some embodiments, the display panel 110 may include more than two folding areas.

As shown in FIG. 1, the display panel 110 may include a first folding area FA1, a second folding area FA2, and a first region 1100*a*, a second region 1100*b*, a third region 1100*c*, and a fourth region 1100*d* partitioned by the first folding area FA1 and the second folding area FA2.

The first folding area FA1 and the second folding area FA2 may extend in different directions. For example, the first folding area FA1 may extend in a first direction, and the second folding area FA2 may extend in a second direction crossing the first direction. The first direction may, for example, be perpendicular to the second direction.

An overlapping area (OA) 300 may be a region in which the first folding area FA1 overlaps the second folding area FA2. That is, the first folding area FA1 and the second folding area FA2 may extend from the overlapping area 300.

The first folding area FA1 of the display panel 110 according to some embodiments may be inner-folded so that a displaying side of the first region 1100*a* and the third region 1100*c* may face a displaying side of the second region 1100*b* and the fourth region 1100*d* along the first folding line FL1. The first folding area FA1 may also be outer-folded so that the displaying side of the first region 1100*a* and the third region 1100*c* and the displaying side of the second region 1100*b* and the fourth region 1100*d* may face outside along the first folding line FL1.

The second folding area FA2 of the display panel 110 according to some embodiments may be inner-folded so that the displaying side of the first region 1100*a* and the second region 1100*b* may face the displaying side of the third region 1100*c* and the fourth region 1100*d* along the second folding line FL2. The second folding area FA2 may be outer-folded so that the displaying side of the first region 1100*a* and the second region 1100*b* and the displaying side of the third region 1100*c* and the fourth region 1100*d* may face outside along the second folding line FL2.

Figure 2:
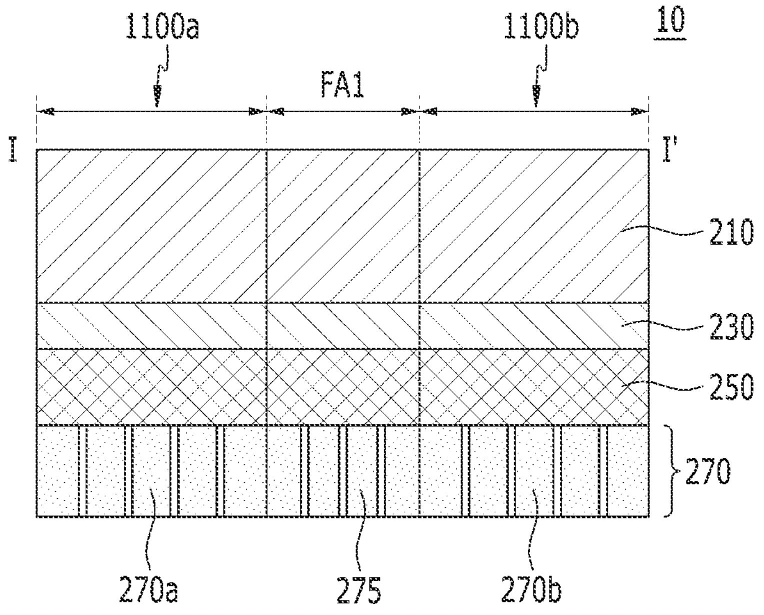
FIG. 2 shows a cross-sectional view of a display device with respect to a line I-I' of FIG. 1.

FIG. 2 shows a cross-sectional view of a display device with respect to a line I-I' of FIG. 1, illustrating a stacking structure of a display device.

As shown, the display device 10 includes a cover member 210, a display panel 240, and a back plate 270. Referring to FIG. 2, the cross-sections of respective layers are marked with hatching, which distinguishes the respective layers and does not show patterns formed on the layers.

The cover member 210 may be positioned on an upper side of the display panel 240 so as to protect the display panel 240 from external impacts. According to some embodiments, the cover member 210 may be attached to the display panel 240 by an adhesive layer.

The cover member 210 may, for example, be a member with various functions such as a touch panel, a polarizer, or a window, or a combination thereof.

When the cover member 210 corresponds to the window, the cover member 210 may have a light-permeable material so as to recognize an image generated by the display panel through the cover member 210 from the outside. For example, the cover member 210 may include a glass material, or may include a plastic material such as poly(methyl methacrylate) (PMMA) resin or polycarbonate (PC) resin. The cover member 210 may be made in a relatively thin film shape so that it may have a flexible characteristic, that is, it is easily bent or folded together with the display panel.

The display panel 240 may include a substrate 250 and a displaying element 230 formed on the substrate 250. The display panel 240 may receive data signals and may display images.

When the display panel 240 is a flexible display panel, the display panel 240 may be realized with an organic light emitting diode (OLED), an electrophoretic display, an electrochromic display (ECD), an electro-wetting display panel, or a quantum dot display panel.

When the display panel 240 is a flat display panel, the display panel 240 may be realized with a liquid crystal display (LCD) or a plasma display device (PDP).

For example, when the display panel 240 is a light emitting diode (LED) panel, the displaying element 230 may include a light emitting diode (LED) and a thin film transistor for driving the light emitting diode (LED). In this instance, the light emitting diode (LED) may include an anode connected to the thin film transistor, an organic emission layer positioned on the anode, and a cathode positioned on the organic emission layer. A barrier film for preventing or reducing permeation of external moisture or other contaminants may be further formed on the light emitting diode (LED).

The substrate 250 may be a flexible substrate including a flexible polymer material such as a polyimide.

The back plate 270 may support the display panel 240. The back plate 270 may include a first support area 270*a* corresponding to a position of a first region 1100*a*, a second support area 270*b* corresponding to a position of a second region 1100*b*, and a region 275 corresponding to a position of the first folding area FA1.

The back plate 270 may overlap the substrate 250 in a thickness direction, and may be arranged at a bottom of the substrate 250. The back plate 270 may be made of a metal material such as stainless steel (SUS) or aluminum, or a polymer such as poly(methyl methacrylate) (PMMA), polycarbonate (PC), polyvinyl alcohol (PVA), acrylonitrile-butadiene-styrene (ABS), or polyethylene terephthalate (PET).

The back plate 270 may have greater rigidity than that of the substrate 250. That is, the back plate 270 may have a greater modulus than that of the substrate 250. Therefore, when an external force for bending the display device 10 is applied, a force that is in an opposite direction to the external force is generated to the back plate 270, and the back plate 270 may maintain the display device 10 in a relatively flat state. Accordingly, it may not be easy to bend the display device 10. In addition, the back plate 270, once it is bent, may not be easily restored to the original flat state. That is, when the display device 10 is repeatedly folded and unfolded, a plastic deformation may be generated to the back plate 270 to disable restoration of the display device 10, and many stresses may be applied to the back plate 270.

To solve this problem, the thickness of the back plate 270 may be reduced, but when the thickness of the back plate 270 is reduced, elastic restoring energy may also be reduced and the restoration may require a relatively long period of time.

According to some embodiments of the present disclosure, holes with various patterns may be formed in the region 275 corresponding to the first folding area FA1 by performing an etching process to the back plate 270. Here, the region 275 may be formed with a same width as the first folding area FA1. The region 275 may be formed to have a width that is greater than that of the first folding area FA1.

The hole may be at least one of an opening, a through hole, or a recess portion (a groove or a hollow), and it includes a shape that may be formed in the back plate 270 by the etching process, but embodiments according to the present disclosure are not limited thereto.

A hole may be arranged in the region 275 along the first folding line FL1 of the first folding area FA1. In the region 275, respective holes may be arranged at equal intervals, and the shapes, sizes, widths, gaps of the holes, and the positions among the respective holes are modifiable. For example, the hole may have various shapes such as a rectangle, a rhombus, an oval shape with a constant shortened length, a circle, a square, or a trapezoid shape, and the shapes are not limited. The region 275 will be described in more detail in the latter portion of the present specification with reference to FIG. 4.

According to some embodiments, the hole positioned in the back plate 270 may be filled with a step compensating member with a same height as the back plate 270. The step compensating member may be made of a material with less rigidity than the back plate 270. That is, the step compensating member may have a lesser modulus than the back plate 270.

For example, the step compensating member may be made of a resin such as polyurethane (PU), thermoplastic polyurethane (TPU), polyacrylate, or rubber, and without being limited thereto, it may be made of any materials that may allow buffering. For example, the step compensating member may be manufactured by various forming methods such as injection molding, extrusion molding, vacuum molding, or casting molding, and for example, it may have a film shape, but is not limited thereto.

The step compensating member may ease the stress applied to the back plate 270 by a folding operation. The step compensating member may prevent the holes arranged on upper/lower portions from being damaged in a process of folding the display device 10, and a force of restoration may be additionally provided to the pattern that is changed for the folding process.

Figure 3:
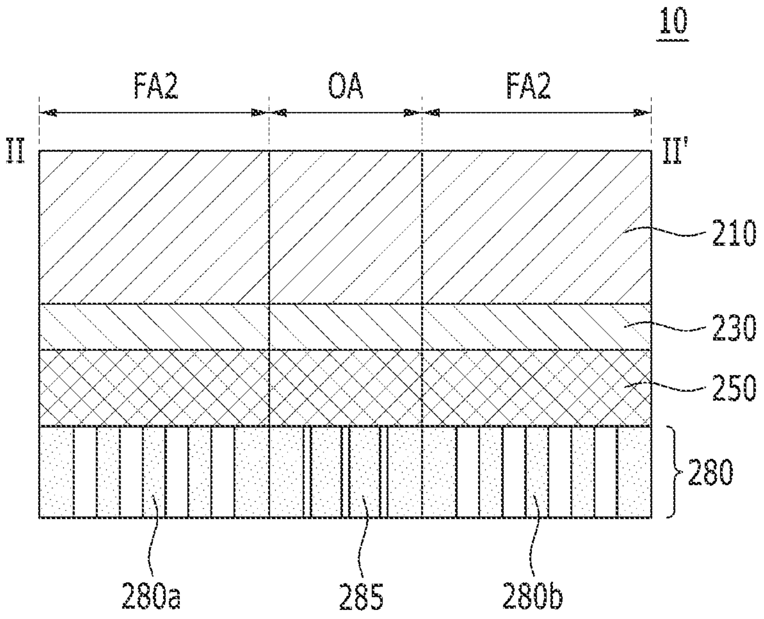
FIG. 3 shows a cross-sectional view of a display device with respect to a line II-II' of FIG. 1.

FIG. 3 shows a cross-sectional view of a display device with respect to a line II-II' of FIG. 1.

As described above, the display device 10 according to some embodiments of the present disclosure includes a cover member 210, a displaying element 230, a substrate 250, and a back plate 280.

The cover member 210, the displaying element 230, and the substrate 250 are as described above.

The back plate 280 may include a third support area 280*a* and a fourth support area 280*b* corresponding to the position of the second folding area FA2, and a region 285 corresponding to the position of the overlapping area 300.

By performing an etching process to the back plate 280, the holes may be formed with various patterns in the third support area 280*a* and the fourth support area 280*b* corresponding to the second folding area FA2.

In the third support area 280*a* and the fourth support area 280*b*, the holes may be arranged along the folding line FL2. The respective holes may be arranged at equal intervals, and the shapes, sizes, widths, gaps of the holes, and the positions among the respective holes are modifiable. For example, the hole may have various shapes such as a rectangle, a rhombus, an oval shape with a constant shortened length, a circle, a square, or a trapezoid shape, and the shapes are not limited.

The region 285 is positioned on the back plate 280 corresponding to the position of the overlapping area 300 in which the first folding area FA1 overlaps the second folding area FA2. The region 285 may have the same area as the overlapping area 300, or it may include the overlapping area 300 and may have a greater area than the overlapping area 300.

In the region 285, the holes may be arranged with a pattern that is symmetric with respect to the first folding line FL1 and is symmetric with respect to the second folding line FL2. The holes in the region 285 may have shapes such as circles, squares, or crosses, and may have arbitrary shapes in a direction parallel with the first folding line FL1 and in a direction parallel with the second folding line FL2. A third pattern region will be described with reference to FIG. 5A to FIG. 5D.

Figure 4:
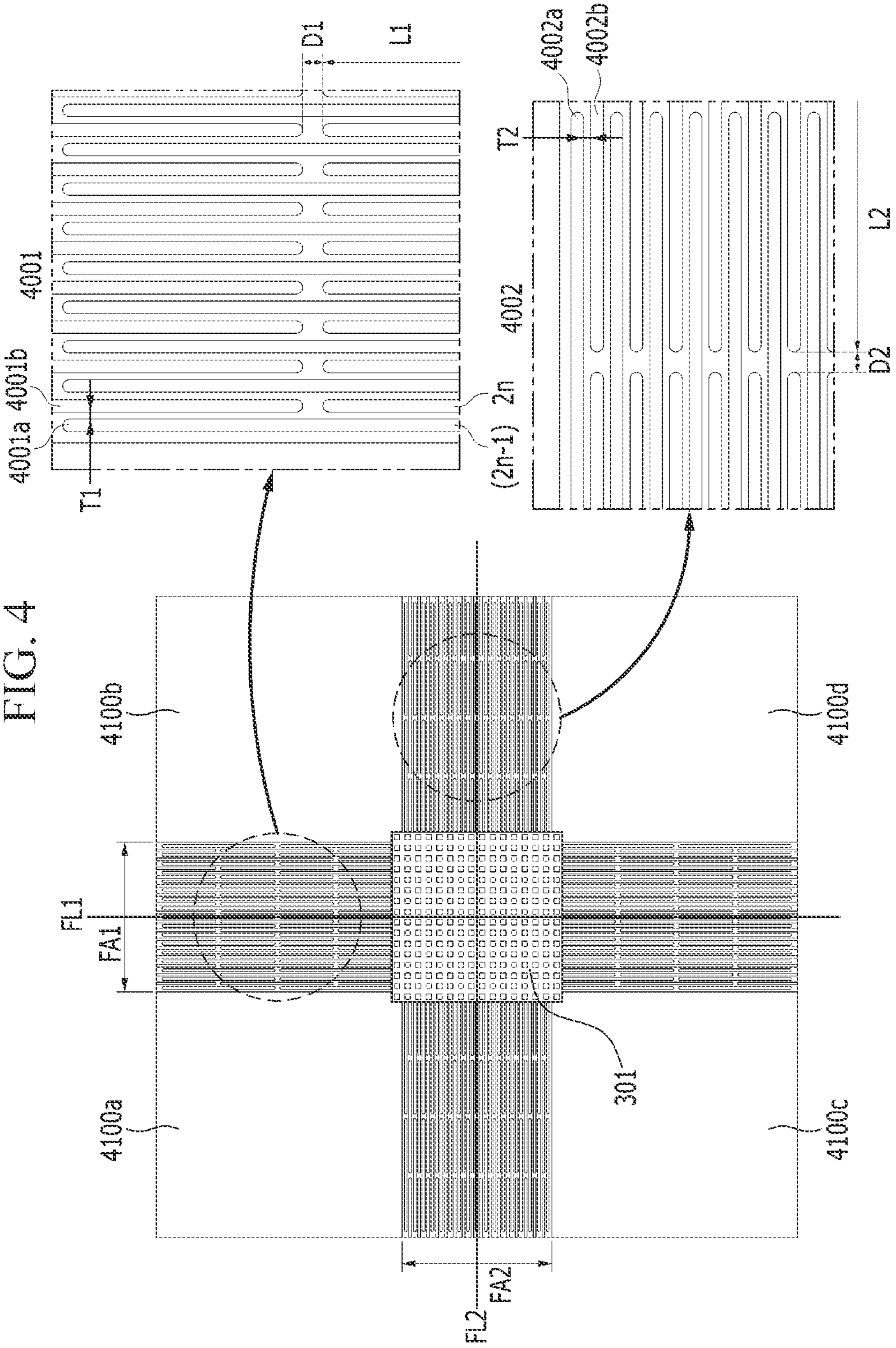
FIG. 4 shows a top plan view of a back plate of a display device according to some embodiments of the present disclosure and an enlarged portion of a region.

FIG. 4 shows a top plan view of a back plate of a display device according to some embodiments of the present disclosure and an enlarged portion of regions of the back plate.

Referring to FIG. 4, the back plate may include a first folding area FA1, a second folding area FA2, and a first region 4100*a*, a second region 4100*b*, a third region 4100*c*, and a fourth region 4100*d* partitioned by a plurality of folding areas.

A plurality of holes may be arranged in the first folding area FA1 along the folding line FL1. A region 4001 shows an enlarged portion of the first folding area FA1. As shown in the region 4001, a plurality of holes positioned in the first folding area FA1 may be arranged so that respective long axes may be positioned to be parallel with the first folding line FL1 and short axes may be positioned to be parallel with the folding direction. A plurality of holes may be formed with a same width as the first folding area FA1, and may be formed with a width that is greater than the width of the first folding area FA1.

The first folding area FA1 may include a plurality of holes formed with a first pattern 4001*a* positioned in the (2n−1)-th column and a second pattern 4001*b* positioned in the 2n-th column, where n is a positive integer (e.g., greater than 0). The first pattern 4001*a* and the second pattern 4001*b* are configured to respectively extend in the column direction. That is, the respective long axes of the first pattern 4001*a* and the second pattern 4001*b* may be parallel with the first folding line FL1.

A first distance D1 between the first pattern 4001*a* and the second pattern 4001*b* may be equal to respective first lengths L1 of the first pattern 4001*a* and the second pattern 4001*b* or may be less than the first lengths L1.

The holes arranged in the (2n−1)-th column as a first pattern 4001*a* may be positioned among the holes arranged in the 2n-th column as a second pattern 4001*b*. For example, the center of the hole arranged as the first pattern 4001*a* may correspond to a space among the holes arranged with the second pattern 4001*b*, and the center of the hole arranged as the second pattern 4001*b* may correspond to a space among the holes arranged with the first pattern 4001*a*. The holes formed with the first pattern 4001*a* in the (2n−1)-th column may be arranged to correspond to the holes formed with the second pattern 4001*b* in the 2n-th column.

The holes may have symmetric shapes with respect to the direction of the first folding line FL1, and the shapes are not limited thereto. For example, the hole may have a shape such as a rectangle of which a long side is parallel with the first folding line FL1 direction in a plan view, or a rhombus, and may have a shape of which a long axis is parallel with the first folding line FL1 direction, or an oval, a circle, or a square.

When the display device is folded in the first folding line FL1, a repulsive force generated to the folding according to a gap (T1) between the holes may be changed. A curvature radius of the display device may be changed when the display device is folded by adjusting an arrangement of holes in the pattern formed in the back plate. Hence, the stress applied to the display panel may be eased to minimize the damage to the display panel.

A plurality of holes may be arranged in the second folding area FA2 along the folding line FL2. A region 4002 shows an enlarged portion of the second folding area FA2. As shown in the region 4002, a plurality of holes positioned in the second folding area FA2 may be arranged so that respective long axes may be positioned to be parallel with the second folding line FL2 and short axes may be positioned to be parallel with the folding direction. A plurality of holes may be arranged with a same width as the second folding area FA2, and may be arranged with a width that is greater than the width of the second folding area FA2.

The second folding area FA2 may include a plurality of holes formed with a first pattern 4002*a* positioned in the (2n−1)-th row and a second pattern 4002*b* positioned in the 2n-th row, where n is a positive integer (e.g., greater than 0). The first pattern 4002*a* and the second pattern 4002*b* are configured to respectively extend in the row direction. That is, the respective long axes of the first pattern 4002*a* and the second pattern 4002*b* may be parallel with the second folding line FL2.

A first distance D1 between the first pattern 4001*a* and the second pattern 4001*b* may be equal to respective first lengths L1 of the first pattern 4001*a* and the second pattern 4001*b* or may be less than the first lengths L1.

The holes arranged in the (2n−1)-th row as a first pattern 4002*a* may be positioned among the holes arranged in the 2n-th row as a second pattern 4002*b*. For example, the center of the hole arranged as the first pattern 4002*a* may correspond to a space among the holes arranged with the second pattern 4002*b*, and the center of the hole arranged as the second pattern 4002*b* may correspond to a space among the holes arranged with the first pattern 4002*a*. The holes arranged with the first pattern 4002*a* in the (2n−1)-th row may be arranged to correspond to the holes arranged with the second pattern 4002*b* in the 2n-th row.

The holes may have symmetric shapes with respect to the direction of the second folding line FL2, and the shapes are not limited thereto. For example, the hole may have a shape such as a rectangle of which a long side is parallel with the second folding line FL2 direction in a plan view, or a rhombus, and may have a shape of which a long axis is parallel with the second folding line FL2 direction, or an oval, a circle, or a square.

When the display device is folded in the second folding line FL2, a repulsive force generated to the folding according to a gap (T2) between the holes may be changed. A curvature radius of the display device may be changed when the display device is folded by adjusting an arrangement of holes in the pattern formed in the back plate. Hence, the stress applied to the display panel may be eased to minimize or reduce the damage to the display panel.

A plurality of holes arranged with a third pattern may be formed in the overlapping area 301 in which the first folding area FA1 overlaps the second folding area FA2. The holes in the overlapping area 301 may have a symmetric shape with respect to the direction of the first folding line FL1 and also with respect to the direction of the second folding line FL2. The holes in the overlapping area 301 will be described in a latter portion of the present specification with reference to FIG. 5A to FIG. 5D.

As described above, various patterns may be formed in the overlapping area 301 by performing an etching process on the back plate. After various patterns are formed in the overlapping area 301, the holes positioned in the overlapping area 301 may be filled with a step compensating member.

According to some embodiments, a portion that corresponds to the overlapping area 301 in the back plate may be made of a resin such as polyurethane (PU), thermoplastic polyurethane (TPU), polyacrylate, or rubber, and without being limited thereto, and it may be made of any materials for allowing buffering. In addition, the above-described various patterns may be formed thereon. FIG. 5A to FIG. 5D show top plan views of an example of a pattern in which a plurality of holes are arranged in an overlapping area 301 of a back plate of FIG. 4. For ease of description, the holes located in the overlapping area 301 are shown in FIG. 5A to FIG. 5D to be formed or arranged to be symmetric with the first folding line FL1 and the second folding line FL2, and a plurality of holes may be arranged to be symmetric with respect to an arbitrary line in parallel with the first folding line FL1 and an arbitrary line in parallel with the second folding line FL2. Further, for ease of description, part of the patterns for forming holes in the overlapping area 301 is illustrated, and is not limited thereto.

Figure 5A:
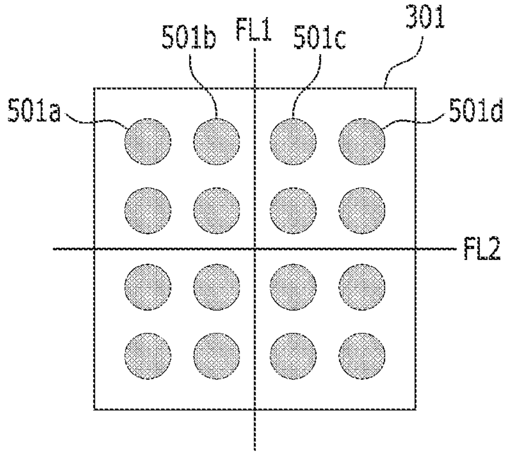
FIG. 5A to FIG. 5D show top plan views of an example of a pattern positioned in an overlapping region of a back plate of FIG. 4.

FIG. 5A illustrates a pattern formed in the overlapping area 301 of the back plate. As shown in FIG. 5A, a plurality of holes in a circular shape in a plan view may be repeatedly arranged in the overlapping area 301. For example, the overlapping area 301 may have a pattern in which a first hole 501*a*, a second hole 501*b*, a third hole 501*c*, and a fourth hole 501*d* are arranged. The first hole 501*a*, the second hole 501*b*, the third hole 501*c*, and the fourth hole 501*d* may have circular shapes in a plan view. A case in which the overlapping area 301 in which a plurality of holes in a circular shape are arranged is incised with respect to a line III-III' in a plan view will be described in more detail below with reference to FIG. 6A to FIG. 6D.

Figure 5B:
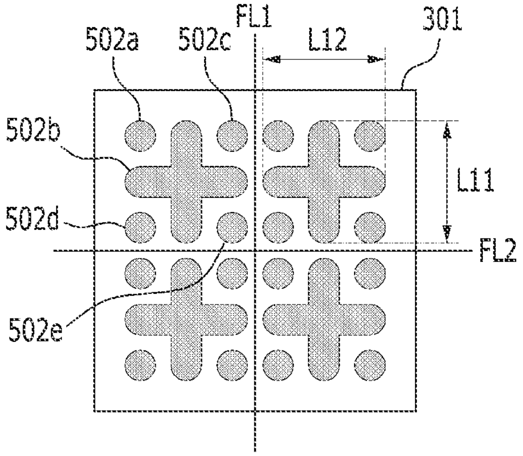

FIG. 5B shows another example of a pattern formed in an overlapping area 301 of a back plate. As shown in FIG. 5B, a hole in a shape in which circles 502*a*, 502*c*, 502*d*, and 502*e* are arranged among two perpendicular rectangles 502*b* to respective ends of which semicircles are combined and four corners may be repeatedly arranged in the overlapping area 301 in a plan view. The first length L11 may be substantially equal to the second length L12.

Figure 5C:
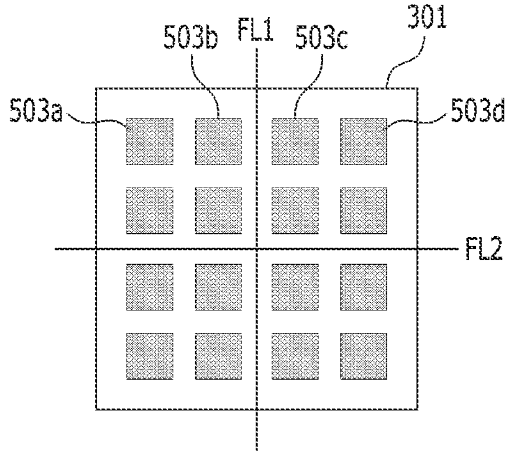

FIG. 5C shows another example of a pattern formed in an overlapping area 301 of a back plate. As shown in FIG. 5C, a plurality of holes in a square shape may be repeatedly arranged in the overlapping area 301 in a plan view. For example, the overlapping area 301 may have a pattern in which a first hole 503*a*, a second hole 503*b*, a third hole 503*c*, and a fourth hole 503*d* are arranged. The first hole 503*a*, the second hole 503*b*, the third hole 503*c*, and the fourth hole 503*d* may have a square shape in a plan view.

Figure 5D:
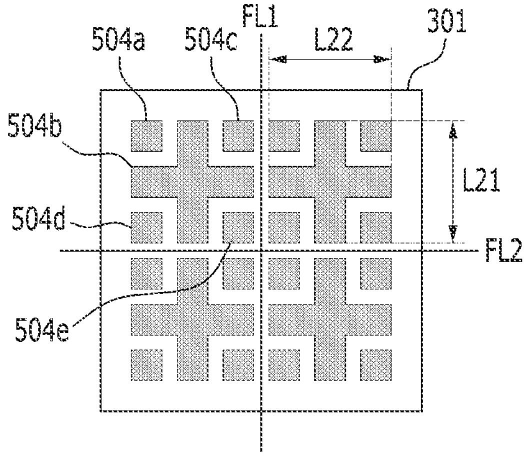

FIG. 5D shows another example of a pattern formed in an overlapping area 301 of a back plate. As shown in FIG. 5D, a hole in a shape in which squares 504*a*, 504*c*, 504*d*, and 504*e* are arranged among two perpendicular rectangles 504*b* and four corners may be repeatedly arranged in the overlapping area 301. The first length L21 may be substantially equal to the second length L22.

That is, the shape of a plurality of holes positioned in the overlapping area 301 is modifiable in many ways as shown in FIG. 5A to FIG. 5D, and holes may be formed with an arbitrary (or any suitable) pattern that is symmetric with respect to the direction of the first folding line FL1 and is also symmetric with respect to the direction of the second folding line FL2. For example, the shapes of the plurality of holes located in the overlapping area 301 may be the same (or substantially the same) as the shapes of the plurality of holes in the first and second folding areas FA1 and FA2 in FIG. 4.

FIG. 6A to FIG. 6D show separated cross-sectional views of an overlapping area when a hole positioned in a back plate is arranged with a pattern according to FIG. 5A.

The display device 10 shown in FIG. 6A to FIG. 6D may include a cover member 210, a displaying element 230, a substrate 250, and a back plate 670. The cover member 210, the displaying element 230, and the substrate 250 correspond to the above-provided descriptions. Referring to FIG. 6A to FIG. 6D, the back plate 670 has a thickness T6.

The back plate 670 may have the above-noted first hole 501*a*, the second hole 501*b*, the third hole 501*c*, and the fourth hole 501*d*.

Figure 6A:
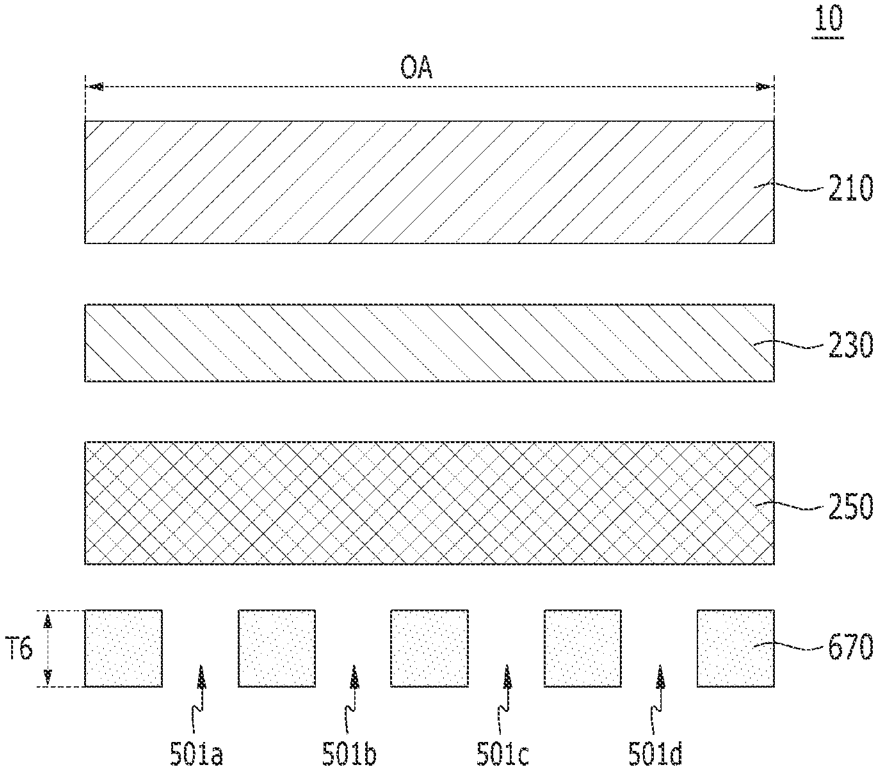
FIG. 6A to FIG. 6D show separated cross-sectional views of an overlapping area in a display device in which a hole positioned in a back plate is arranged with a pattern according to FIG. 5A.

FIG. 6A shows a display device 10 including a hole positioned in a back plate 670. The holes positioned in the overlapping area 301 may penetrate the back plate 670 in a thickness direction of the back plate 270.

Figure 6B:
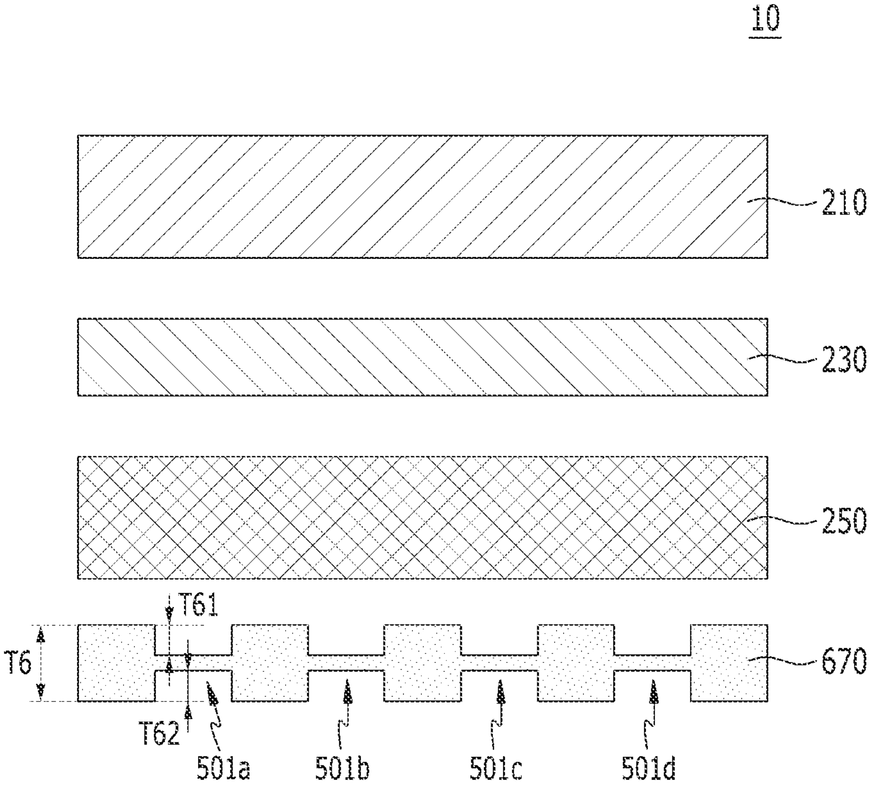

FIG. 6B shows a display device 10 including a hole positioned in an upper side and a lower side of the back plate 670 with a thickness (e.g., a set or predetermined thickness). The hole positioned on the lower side of the back plate 270 may be positioned corresponding to the respective positions of the holes positioned in the upper side of the back plate 670. The hole positioned in the upper side of the back plate 670 may have a first thickness T61, and the hole positioned in the lower side may have a second thickness T62. The first thickness T61 and the second thickness T62 may be substantially the same or may be different from each other. In this instance, a sum of the first thickness T61 and the second thickness T62 is less than the thickness T6.

Figure 6C:
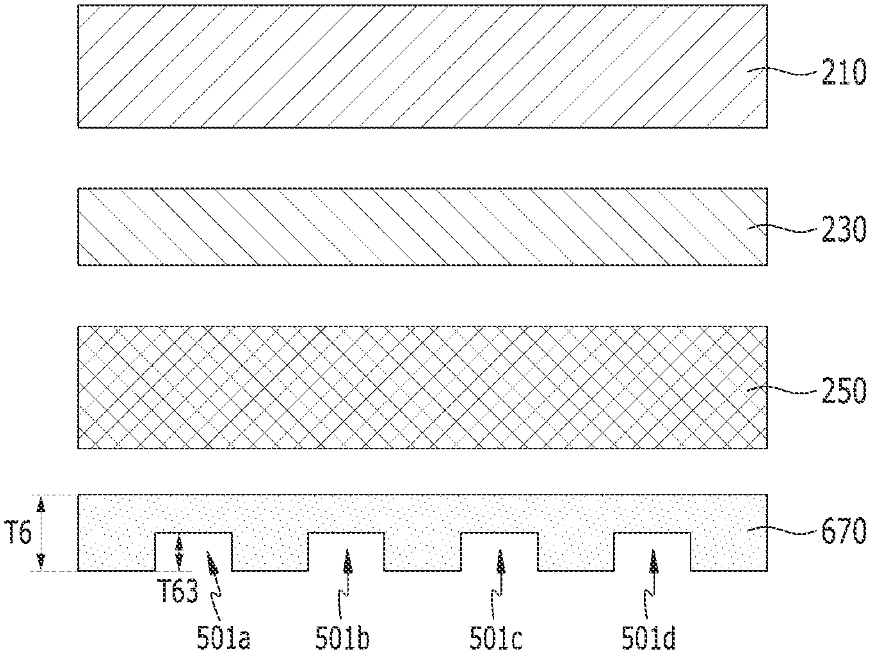

FIG. 6C shows a display device 10 in which a hole has an overlapping area 300 formed with a thickness (e.g., a set or predetermined thickness) on a lower side of the back plate 670. The hole positioned in the lower side of the back plate 670 may have a third thickness T63. The third thickness T63 is less than the thickness T6.

Figure 6D:
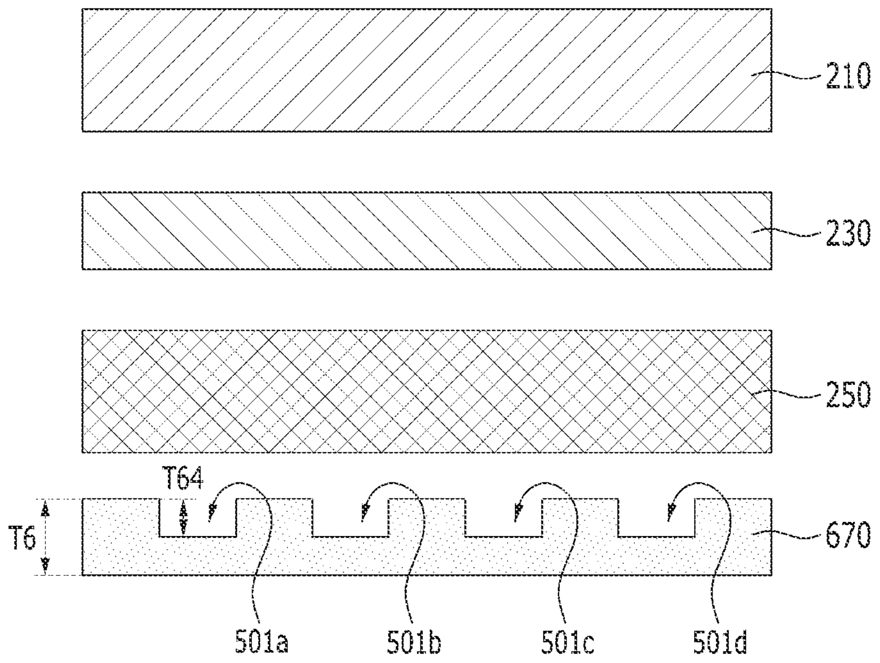

FIG. 6D shows a display device 10 in which a hole has an overlapping area 300 formed with a thickness (e.g., a set or predetermined thickness) on an upper side of the back plate 670. The hole positioned in the upper side of the back plate 670 may have a fourth thickness T64. The fourth thickness T64 is less than the thickness T6.

As shown in FIG. 6A to FIG. 6D, the hole may be formed in the back plate 670 by a method that is appropriate for the display device 10. For example, when the display device 10 is inner-folded, the hole may be formed in the back plate 670 as shown in FIG. 6A or FIG. 6C.

As described above, the holes shown in FIG. 6A to FIG. 6D may be filled with a step compensating member.

Figure 7:
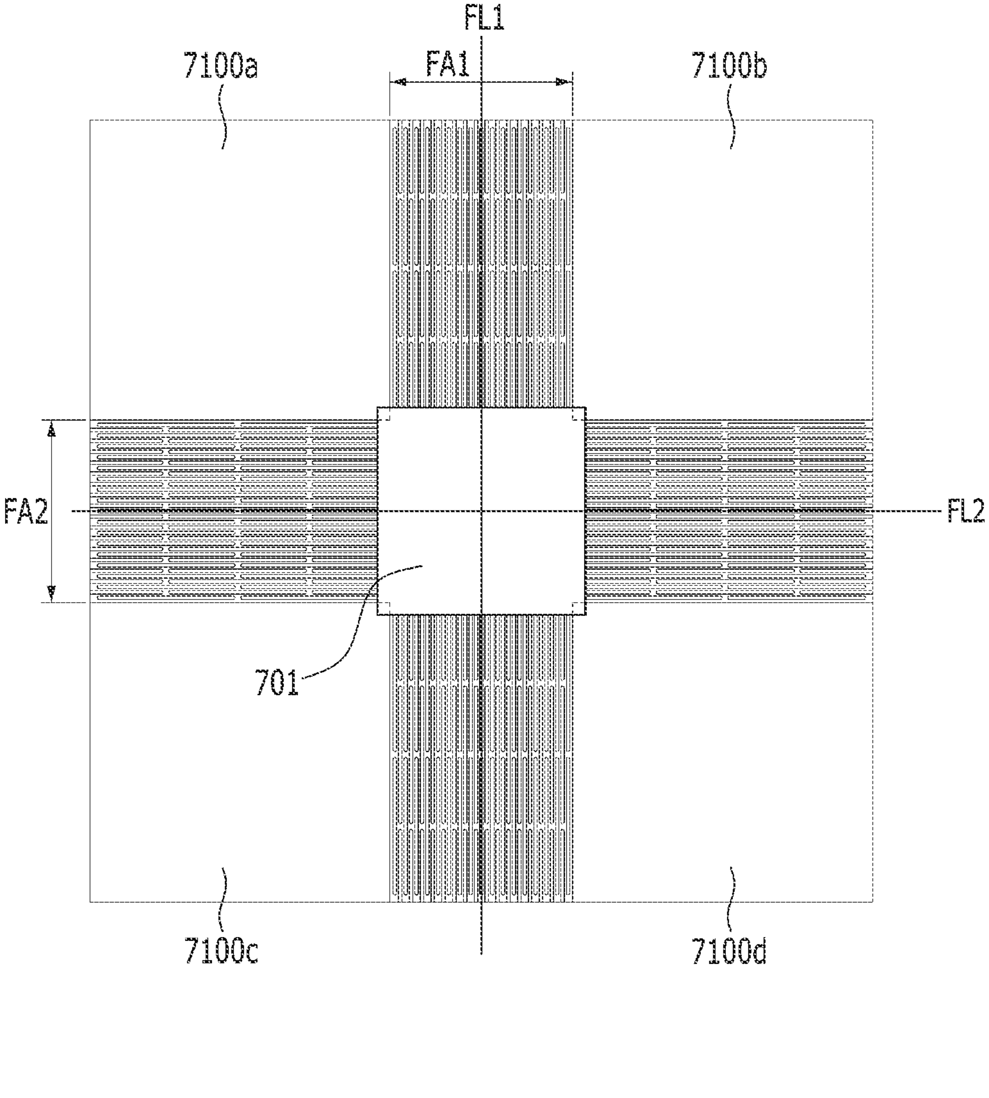
FIG. 7 shows a top plan view of a back plate of a display device according to some embodiments of the present disclosure.

FIG. 7 shows a top plan view of a back plate of a display device according to some embodiments of the present disclosure.

Referring to FIG. 7, the back plate may include a first folding area FA1, a second folding area FA2, and a first region 7100*a*, a second region 7100*b*, a third region 7100*c*, and a fourth region 7100*d* partitioned by the first folding area FA1 and the second folding area FA2.

The first region 7100*a*, the second region 7100*b*, the third region 7100*c*, and the fourth region 7100*d* are similar to the above-described first region 4100*a*, second region 4100*b*, third region 4100*c*, and fourth region 4100*d*, so some repetitive descriptions thereof may be omitted.

A plurality of holes may be arranged along the first folding line FL1 in the first folding area FA1. Regarding a plurality of holes positioned in the first folding area FA1, respective long axes may be positioned in parallel with the first folding line FL1, and short axes may be arranged in parallel with the folding direction. A plurality of holes may be formed with the same width as the first folding area FA1, and they may be formed with the width that is greater than the width of the first folding area FA1. The holes may have a shape that is symmetric with respect to the direction of the first folding line FL1, and the shape is not limited.

A plurality of holes may be arranged along the folding line FL2 in the second folding area FA2. Regarding a plurality of holes positioned in the second folding area FA2, respective long axes may be positioned in parallel with the second folding line FL2, and short axes may be arranged in parallel with the folding direction. A plurality of holes may be formed with the same width as the second folding area FA2, and they may be formed with the width that is greater than the width of the second folding area FA2. The holes may have a shape that is symmetric with respect to the direction of the second folding line FL2, and the shape is not limited.

A flexible portion 701 may include an overlapping area of the first folding area FA1 and the second folding area FA2. The flexible portion 701 may have a width in the direction of the first folding line FL1 that is greater than the width of the second folding area FA2 in the direction of the first folding line FL1, and may have a width in the direction of the second folding line FL2 that is greater than the width of the first folding area FA1 in the direction of the second folding line FL2. Referring to FIG. 7, the flexible portion 701 is illustrated to be a quadrangle, and it may have an arbitrary shape including the overlapping area.

The flexible portion 701 may be made of resin such as polyurethane (PU), thermoplastic polyurethane (TPU), polyacrylate, rubber, silicon (Si), or a combination thereof, and without being limited thereto, and it may be made of any materials for allowing buffering, and a combination thereof. For example, the flexible portion 701 may be configured with what is manufactured by various forming methods such as injection molding, extrusion molding, vacuum molding, or casting molding.

No holes may be positioned in the flexible portion 701. The case in which a plurality of holes are positioned in the flexible portion 701 may be referred to as what is described with reference to FIG. 4.

The use of all examples or illustrative terms (for example, etc.) in the present invention is merely for describing the present invention in detail, and the scope of the present invention is not limited by examples or illustrative terms unless limited by the claims. In addition, a person skilled in the art may recognize that various modifications, combinations, and changes may be configured according to design conditions and factors within the scope of the appended claims or their equivalents.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and their equivalents.

What is claimed is:

1. A display device comprising:

a display panel; and a back plate on a rear side of the display panel, and including a first folding area configured to be folded in a first direction and a second folding area crossing the first folding area and configured to be folded in a second direction, wherein the first folding area includes a plurality of first holes of which a length in the first direction is less than a length in the second direction in a plan view.

2. The display device of claim 1, wherein the first holes have a first length in the first direction and have a second length in the second direction, and the first length is less than the second length.

3. The display device of claim 2, wherein the second folding area includes a plurality of second holes of which a length in the first direction is greater than a length in the second direction in a plan view.

4. The display device of claim 3, wherein the second holes have a third length in the first direction and have a fourth length in the second direction, and the third length is greater than the fourth length.

5. The display device of claim 1, wherein the display panel includes a flexible substrate, and a modulus of the back plate is greater than that of the flexible substrate.

6. The display device of claim 2, wherein the first holes have at least one shape of a rectangle of which a long side is parallel with the second direction, a rhombus of which a long side is parallel with the second direction, an oval of which a long axis is parallel with the second direction, and a square.

7. The display device of claim 4, wherein the second holes have at least one shape of a rectangle of which a long side is parallel with the first direction, a rhombus of which a long side is parallel with the first direction, an oval of which a long axis is parallel with the first direction, and a square.

8. The display device of claim 4, wherein the back plate further includes a third folding area, and the third folding area includes a region in which the first folding area overlaps the second folding area.

9. The display device of claim 8, wherein a length of the third folding area in the first direction is greater than the first length, and a length thereof in the second direction is greater than the fourth length in a plan view.

10. The display device of claim 8, wherein the third folding area includes a plurality of third holes of which a length in the first direction is greater than the length in the second direction in a plan view, and the third holes have a first length in the first direction, and have a fourth length in the second direction.

11. The display device of claim 8, wherein the third folding area includes a plurality of third holes of which a length in a first direction is less than a length in a second direction in a plan view, and the third holes have a first length in the first direction, and have a fourth length in the second direction.

12. The display device of claim 8, wherein the third folding area includes a plurality of third holes of which a length in a first direction is equal to a length in a second direction in a plan view, and the third holes have a first length in the first direction, and have a fourth length in the second direction.

13. The display device of claim 8, wherein the third folding area is made of at least one of polyurethane (PU), thermoplastic polyurethane (TPU), polyacrylate, rubber, or silicon.

14. The display device of claim 13, wherein the third folding area is manufactured by at least one method of injection molding, extrusion molding, vacuum molding, and casting molding.

15. The display device of claim 10, wherein the back plate further includes a step compensating member for filling the third holes.

16. The display device of claim 15, wherein the step compensating member is made of at least one of polyurethane (PU), thermoplastic polyurethane (TPU), polyacrylate, or rubber.

17. The display device of claim 10, wherein the third holes penetrate the back plate in a thickness direction of the back plate.

18. The display device of claim 10, wherein the third holes are positioned on at least one of an upper side or a lower side of the back plate, and a depth of the third holes is less than a depth of the back plate.

19. A back plate comprising:

a first folding area folded in a first direction;

a second folding area crossing the first folding area and folded in a second direction; and a third folding area in which the first folding area overlaps the second folding area, wherein the first folding area includes a plurality of first holes of which a length in the first direction is less than a length in the second direction in a plan view, the first holes have a first length in the first direction and have a second length in the second direction, and the first length is less than the second length, the second folding area includes a plurality of second holes of which a length in the first direction is greater than a length in the second direction in a plan view, and the second holes have a third length in the first direction and have a fourth length in the second direction, and the third length is greater than the fourth length, and the third folding area includes a plurality of third holes of which a length in a first direction is equal to a length in a second direction in a plan view, and the third holes have a first length in the first direction, and have a fourth length in the second direction.

* * * * *